United States Patent Office 3,392,137
Patented July 9, 1968

---

3,392,137
COPOLYMER OF VINYL CHLORIDE AND FUMARIC ACID DIESTERS AND AROMATIC SOLVENT SOLUTION THEREOF
Robert J. Slocombe, Kirkwood, Mo., assignor to Monsanto Company, St. Louis, Mo., a corporation of Delaware
No Drawing. Filed May 13, 1963, Ser. No. 280,069
17 Claims. (Cl. 260—33.6)

The present invention is directed to copolymers of vinyl chloride with diesters of fumaric acid in which one of the esterifying groups is an hydroxyalkyl radical or an hydroxyalkylene ether radical, and to methods of preparing such copolymers by copolymerizing vinyl chloride with such diesters.

Polyvinyl chlorides are well known commercial molding resins. While such resins have valuable and useful properties, they are at the same time limited by their properties to certain general applications. In the present invention it has been discovered that the incorporation of certain hydroxylated fumarates as comonomer with vinyl chloride results in modification of various properties and also the hydroxyl group provides a site for curing or cross-linking or additional reactions.

It is an object of the present invention to prepare an hydroxylated polyvinyl chloride suitable for use as a coating resin. It is a further object to prepare a hydroxylated vinyl chloride polymer which is relatively soluble in aromatic solvents. It is another object to prepare a hydroxylated vinyl chloride polymer which is of relatively low molecular weight. It is yet another object to prepare a hydroxylated vinyl chloride polymer which is thermosetting or rendered thermosetting by treatment with various curing or crosslinking agents.

The copolymers of the present invention result from copolymerization of vinyl chloride with diesters of fumaric acid as represented by the formula:

$$R_1-O-\overset{O}{\underset{\|}{C}}-CH=CH-\overset{O}{\underset{\|}{C}}-O-R_2$$

in which $R_1$ is alkyl, cycloalkyl, aryl, aralkyl, alkaryl, etc., and $R_2$ is

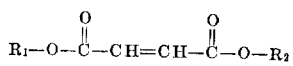  or  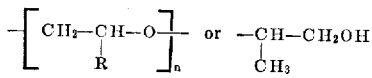

where $n$ is a number of average value from one to 8, and R is hydrogen or methyl. It is preferred that $R_1$ contain no more than 10 carbon atoms and particularly that it be an alkyl group of no more than 10 carbon atoms, e.g., methyl, ethyl, propyl, isopropyl, butyl, isobutyl, t-butyl, pentyl, n-hexyl, isohexyl, octyl, decyl, etc. It is preferred that $n$ be one and it is also preferred that R be hydrogen, and it is particularly preferred that $R_2$ be hydroxyethyl. It will be understood that the fumarate esters employed in the present invention have the trans structure characteristic of fumaric acid and its esters. The copolymerization occurs between the vinyl linkage of the vinyl chloride and the olefinic carbon-to-carbon bond of the fumarate. Particularly suitable fumarates for use in the present invention are those in which $R_1$ in the above formula is an alkyl group of 1 to 10 carbon atoms, and $R_2$ is beta-hydroxyethyl.

The hydroxyl-bearing radicals suitable as esterifying groups on the fumarate can conveniently be termed hydroxy(oxa)hydrocarbyl radicals, it being understood that oxygen atoms can interrupt the hydrocarbon units and be present in an alkylene or polyalkylene ether chain, or can be absent leaving a strictly hydrocarbon group between the hydroxy group and the oxygen of the

group to which the hydrocarbyl radical is attached.

The ratio of monomers forming the copolymer can vary considerably, depending upon the application in view. For example, amounts of the defined hydroxy fumarates can vary from less than about 2% to 75% or more by weight, although ordinarily the amount of the particular hydroxy fumarates will be in the range of 5% to 55% by weight. In applications in which the copolymer is to be used in solution as a coating material, it is preferred that the particular hydroxy fumarates constitute 10% to 40% by weight, or more particularly 12% to 30% by weight; for economic considerations it is desirable to utilize the lower amounts, but it is somewhat easier to obtain the low molecular weights suitable for solubility if the amounts of the hydroxy fumarates are near the upper end of the ranges, although alternative means for controlling molecular weight can be employed. In the case of copolymers for molding applications, particularly for thermosetting properties, the use of fairly high amounts of the particular hydroxy fumarates is of en advantageous as it contributes to the curing and thermosetting properties.

The copolymers of the present invention can be produced in various molecular weight ranges; however, it is preferred that they have molecular weight ranges of the order of 1000 to 25,000 or more particularly, 1000 to 10,000 (number average molecular weights as determined by vapor phase osmometer). In solution and coating applications the use of relatively low molecular weights, often less than 5000, is important with respect to solubility and viscosity, and it is also significant with respect to obtaining low melt viscosity for laminating applictions. For solution applications, copolymer having a viscosity in the range of about U to about X on the Gardner scale measured as a 50% solids solution in a 50:50 weight mixture of methyl isobutyl ketone:toluene is particularly suitable. For solution applications in general, it is desirable that the copolymers be soluble in toluene, xylene or other aromatic hydrocarbon solvents at 50% by weight or higher solids concentrations, and also in ketone solvents, or in mixtures of aromatic and ketone solvents, containing for example up to 50% of methyl isobutyl ketone or 4-methoxy-4-methyl-pentanone-2, in contrast to the very limited solubility of polyvinyl chloride in toluene, xylene or such ketones as methyl ethyl ketone, although lesser concentrations such as 30% or 40% by weight can at times be used.

The copolymers of the present invention are prepared under condition suitable for free-radical catalyzed polymerization of vinyl compounds. The polymerization is generally conducted at slightly elevated temperatures at atmospheric or autogenous pressures in the presence of peroxide or azo catalysts. Temperatures of the order of 50 to 100° C., are preferred, and it is generally desirable not to exceed temperatures of 140–150° C., because of thermal stability considerations. If desired, low temperature catalysts, e.g., trialkyl boron in combination with oxygen, can be employed to conduct the polymerization at very low temperatures, e.g., −20 or −30° C., or lower, or the polymerization can be effected at room temperature. The temperature and amount of catalyst can be regulated to control molecular weight of the copolymer, higher temperatures and higher amounts of catalysts causing production of lower molecular weights. The polymerization media also influence molecular weight, polymerization in solution, for example, resulting in lower molecular weight copolymer than obtained in emulsion polymerization. Solution, mass, or emulsion polymerization systems can be employed in the present invention. When use of the copolymer as a solution for coating applications is contemplated, it will often be desirable to conduct the polymerization in solution. Various hydrocarbon or ketone solvents are suitable as solution media, e.g., xylene, toluene, benzene, acetone, cyclohexanone, n-hexane, kerosene, etc. It at times is desirable to use a solvent which dissolves the monomers but which has little or no solvent power with respect to the polymer, causing the polymer to precipitate as formed.

The hydroxy fumarates employed in the present invention, e.g., hydroxyalkyl alkyl fumarates, enter the copolymer at a faster rate than vinyl chloride. Hence, heterogeneous copolymer product can be obtained by simply continuing an ordinary batch polymerization to a fairly high conversion without adding additional monomer. However, it is generally desirable to obtain a fairly uniform copolymer product; this can be done by stopping the polymerization at a fairly low conversion, e.g., at a point where substantially all of the hydroxy fumarate has polymerized. Alternatively, a relatively uniform ratio of unpolymerized monomers can be maintained by addition of fumarate or vinyl chloride, fumarate and isobutylene, or by removal of isobutylene and fumarate at the proper rate.

The monomers can be polymerized in wide proportions, e.g., the hydroxyalkyl alkyl fumarate constitutes 1% to 99% by weight of the monomer charge. However, since the hydroxyalkyl alkyl fumarates enter the copolymer at a fast rate, they can be charged to the polymerization in relatively very small amounts, for example fractions of 1% by weight to 5% by weight. For example, it would seldom be necessary to exceed 20% by weight of the monomer charge to obtain very high percentages of the hydroxyalkyl alkyl fumarate in the copolymer, and ordinarily the amount of hydroxyalkyl fumarate would be no greater than about 10% by weight of the monomers, and in fact often no more than 5% by weight. Of course, it is necessary to replenish the supply of fumarate as used if the copolymer is to have higher amounts of fumarate when the polymerization is carried to high conversion. It is not necessary to maintain a precisely constant monomer ratio, but the hydroxyalkyl hydroxy fumarate should be present in substantial amount at all times if relatively uniform copolymer is to be obtained.

The purity of the hydroxy fumarate monomer employed in the present process has an important bearing on the properties of the resulting copolymer. In particular the presence of certain free acid groups should be avoided. For example, crude hydroxyethyl ethyl fumarate prepared by ethoxylation of monoethyl fumarate ordinarily contains about 6% by weight of monoethyl fumarate. This can be reduced to about 3% by weight by vacuum distillation and to less than 1% by weight by converting the monoethyl fumarate to its alkali salt or similar procedures. The monoethyl fumarate, if present, enters the copolymer and the resulting free carboxyl groups tend to cause cross-linking and poor solvent solubility of the copolymer. It is desirable that the hydroxy fumarates employed in the present invention contain amounts less than 5%, for example less than 2% and preferably less than 1% by weight of fumarate monoester. For example, monomer requiring less than about 0.14 milliequivalent base/gram for neutralization or more preferably less than about 0.105 milliequivalent base/gram is suitable.

However, it has also been found possible to minimize the effect of fumarate monoesters by including a base in the polymerization mixture, particularly an organic amine, as disclosed and claimed in copending application case S.N. 280,147 filed May 13, 1963 and issued July 12, 1966 as Patent No. 3,260,704. Amines form cations with the fumarate monoesters thereby preventing them from taking part in the polymerization. Tertiary amines, particularly tertiary aliphatic amines, are especially suited for such use, e.g., such trialkylamines as trimethylamine, tripropylamine, triisopropylamine, tributylamine, triamylamine, trihexylamine, diethylmethylamine, etc., particularly such amines in which the alkyl groups have 1 to 10 carbon atoms. Primary and secondary amines can also be employed, e.g., ethylamine, n-hexylamine, ethylmethylamine, etc. Aromatic amines can also be employed, although care should be exercised to avoid any undue inhibition of the polymerization. Various heterocyclic amines, e.g., pyridines, piperidines, morpholines, etc., are also suitable. In general it is preferred that the amine be hydrocarbon in structure aside from the amino nitrogen atom. For good results the amine should be employed in at least substantially a stoichiometrically equivalent amount to fumarate monoester present in the polymerization mixture, and this should not be greatly exceeded for optimum results, although larger amounts can be employed. Ordinarily the amount of amine will be approximately 1 to 1.5 moles per equivalent of acid in the monomers. A large excess is undesirable as it tends to cause splitting out of HCl and generation of color. Moreover, a large excess of amine causes undue inhibition of catalyst with lowered conversion rates.

Various catalysts can be employed in the polymerization of the present invention, for example, inorganic or organic peroxide, azo catalysts and redox catalysts. Azo catalysts such those illustrated in U.S. Patent Numbers 2,471,959; 2,515,628; 2,520,338; 2,520,339; and 2,565,573 can be employed; to further illustrate, azobisisobutyronitrile, methyl azobisisobutyrate, and diethyl-2,2'-azobis-(2-methyl propionate) are suitable. Peroxy catalysts such as peroxides or carbonates can be employed, e.g., ditertiarybutyl peroxide, benzoyl peroxide, lauroyl peroxide, tert-butyl perbenzoate, etc. Various boron hydride or alkyl boron catalyst can also be employed, e.g., trialkyl boron in combination with oxygen. In general it is preferred to utilize the azo catalysts as they have less tendency to affect the polymer properties by initiator fragments in the polymer, than do such peroxide catalysts as, for example, lauroyl peroxide. In addition, if amines are employed in the polymerization, they have less tendency to react with azo catalysts than with peroxide catalysts.

It will be recognized that the copolymers of the present invention can include other monomers in addition to the vinyl chloride and hydroxy fumarate monomers, for example, in amounts up to 15% or so, various vinyl monomers copolymerizable with vinyl chloride, for example, vinyl acetate, ethyl acrylate, methyl methacrylate, etc., being suitable.

The copolymers of the present invention have free hydroxyl groups and can suitably be cured by various procedures suitable for effecting cross-linking.

The invention is illustrated by the following examples:

Example 1.—n-Butylhydroxyethyl fumarate and vinyl chloride copolymers

Stainless steel bombs were charged with monomer mixtures of vinyl chloride and butylhydroxyethyl fumarate of the percentage constitution indicated in Table I. The initial runs employed "clear" butylhydroxyethyl fumarate, which contains hydroquinone as a polymerization inhibitor, while the latter two (2) experiments had a cloudy product from which the inhibitor had been removed by treatment with alumina. A small amount of azobisisobutyronitrile, 0.08 g., was added to each run as a catalyst. The bombs were then sealed, placed in a water bath and equilibrated to 25° C., with shaking every five (5) minutes. The bombs were transferred to a 60° bath for the indicated reaction periods after which the bombs were removed and quickly cooled to about −25° C., with Dry-Ice-acetone bath, and opened. The contents were transferred to a beaker containing methanol and stirred while warming to room temperature. The methanol was decanted off and the white precipitate dried in a vacuum oven. The copolymer was soluble in tetrahydrofuran, dioxane and pyridine. The conversions and copolymer composition were as given in Table I below.

TABLE I

| Run No. | Monomer Ratio, VCl/BHF, wt. Percent | Type BHF Reaction | | Conversion to Copolymer, Percent | Copolymer Composition, VCl/BHF, wt. Percent |
|---|---|---|---|---|---|
| | | Used | Time, hrs. | | |
| 1 | 95/5 | Clear | 4 | 8.3 | 65.8/34.2 |
| 2 | 90/10 | ___do___ | 4 | 6.5 | 54.8/45.2 |
| 3 | 98/2 | ___do___ | 2 | 7.9 | 83.0/17.0 |
| 4 | 98/2 | ___do___ | 4 | 3.5 | 82.3/17.7 |
| 5 | 98/2 | Cloudy | 4 | 27.1 | 92.5/7.5 |
| 6 | 95/5 | ___do___ | 2 | 6.4 | 72.3/27.7 |

VCl=vinyl chloride, BHF=butylhydroxyethyl fumarate.

Example 2

A reactor was charged with 54 grams vinyl chloride, 6 grams ethyl hydroxyethyl fumarate and 0.18 gram azobisisobutyronitrile, 10 grams acetone and 0.1% by weight triethylamine based on the ethyl hydroxyethyl fumarate. The triethylamine was dissolved in the acetone. The mole ratio of triethylamine to monoethyl fumarate present was 1.5/1. The reactants were heated to 60° C., for 2½ hours. The reactor was then emptied into 200 ml. cold methanol and rinsed with 10 ml. acetone. The methanol was then heated to 50° C., with stirring, cooled to −20° C., and decanted from the copolymer. The copolymer was dried in a vacuum oven at 40° C., and did not cross-link while drying. The copolymer exhibited excellent film properties upon curing at 150° C., for 15 minutes on a steel panel, including good hardness and impact strength. Butylated melamine formaldehyde resin, Resimene 882, added in 20% concentration prior to curing was compatible and hastened curing but this amount adversely affected impact strength indicating over-curing. Solutions in 1:1 methyl isobutyl ketone:toluene containing 50% solids were prepared, and both with and without the added resin, gave water-white castings.

A companion run in which the ratio of triethylamine to monoethyl fumarate was 0.14 to 1 cross-linked upon drying and showed insolubilization.

Example 3

Several polymerizations were made using ethyl hydroxyethyl fumarate monomer containing a higher amount of monoethyl fumarate, viz., 4.2%, and employing a 90/10 ratio of vinyl chloride to ethyl hydroxyethyl fumarate with 0.1 mole percent azobisisobutyronitrile at 60° C., and different amounts of triethylamine. The copolymer from a polymerization employing 0.62 mole triethylamine (per mole monoethyl fumarate) cross-linked upon drying, while those from polymerizations employing 1.23 moles and 1.76 moles triethylamine had very good properties.

Example 4

Copolymerizations of vinyl chloride (VCl) and ethyl-hydroxyethyl fumarate were carried out under the conditions and with the results indicated:

| | A | B | C |
|---|---|---|---|
| Charge ratio, VCl/EHF | 96/4 | 96/4 | 96/4 |
| Initiator, 0.1 mol percent | (1) | (1) | (2) |
| Temperature, °C | 70 | 70 | 70 |
| Reaction Time, min | 30 | 30 | 45 |
| Conversion | 6.0 | 6.0 | 7.7 |
| Work-up [3] | | | |
| Polymer Composition: | | | |
| VCl, percent | 65.3 | 65.9 | 77.2 |
| EHF, percent | 21.8 | 17.8 | 20.1 |
| Monoethyl fumarate, percent | 1.6 | 1.9 | 0.16 |
| Unidentified, percent | 11.3 | 14.4 | 2.5 |
| Molecular weight | 1,460 | 4,450 | 3,750 |
| Gardner viscosity [4] | 0 | | V |

[1] Lauroyl peroxide.
[2] Azobisisobutyronitrile.
[3] Run A was precipitated from reaction mixture by pouring into ice water. Run B was treated as in A and then washed with xylene at room temperature. Run C was precipitated like A and then redissolved in acetone and reprecipitated in methanol to remove residual initiator.
[4] 40% solids in 1:1-methyl isobutyl ketone/toluene.

Example 5

Vinyl chloride and ethyl hydroxyethyl fumarate were provided in a 90/10 weight ratio and copolymerized at 70° C. for 15 minutes in procedures using 15 ml. acetone, 0.18 gram azobisisobutyronitrile, 54 grams vinyl chloride and 6 grams ethyl hydroxyethyl fumarate. The ethyl hydroxyethyl fumarate contained 4.2 weight percent monoethyl fumarate, and triethylamine was present in some runs in the amounts indicated.

| Run | Grams Triethylamine | Conversion | Weight percent Vinyl Chloride | Weight percent Monoethyl Fumarate |
|---|---|---|---|---|
| 1 | 0 | 6.7 | 46.3 | 2.5 |
| 2 | 0.05 | 10.1 | 48.2 | 1.8 |
| 3 | 0.10 | 7.4 | 46.0 | 1.3 |
| 4 | 0.17 | 6.2 | 45.4 | 1.2 |

The product of Run No. 1 containing 2.5% monoethyl fumarate was greenish in color and corrosive to metal substrates, compared to the nearly colorless appearance of the other products, and in addition tended to cross-link and become insoluble at slightly elevated temperatures. The advantage of employing amines to counteract acidity when the fumarate contains relatively high amounts of monoethyl fumarate is thus demonstrated. Vinyl chloride/hydroxyalkyl fumarate copolymer containing suitably low amounts of monoethyl fumarate can also be prepared by utilizing hydroxyalkyl fumarate having a low monoethyl fumarate content. The copolymers are of especial interest when the monoethyl fumarate content is no greater than 2% by weight, preferably no greater than 1.5% by weight. The desired low acid copolymers will have acidity such that no more than 0.14 milliequivalent base/gram of copolymer is necessary for neutralization, and preferably no more than 0.105 milliequivalent base/gram copolymer.

The process of copolymerizing vinyl chloride and hydroxy fumarate copolymers in the presence of bases is further described and claimed in the copending application of the applicant and Robert Z. Greenley, S.N. 280,148 filed May 13, 1963 and issued July 12, 1966 as Patent No. 3,260,705.

A copolymer prepared as in procedure C of Example 6 was dissolved in acetone, precipitated in water and vacuum dried at 50° C., 1–3 mm., for 18 hours. A film was cast on a sodium chloride window and the infra red spectrum obtained. The cast film was heated in vacuum (simultaneously with a 500 mg. sample of the copolymer) at a rate to increase temperature 2°/minute to 200° C. The material lost 5.8% of its weight and vapor phase chromatographic analysis of the collected volatile products indicated the following in order of decreasing amounts: water, diethyl ether, ethanol, and ethylene glycol. The infra red spectrum of the cured film was compared with the uncured material and it was noted that hydroxyl absorption had decreased, free carboxyl had decreased, an open chain anhydride doublet had replaced the ester band, —C—$CH_3$ had decreased, and bands appeared for both conjugated and non-conjugated unsaturation. In another procedure, the vacuum oven was preheated to 150° C. and the film and sample inserted. The materials were kept in the oven about 10 minutes after the sample reached oven temperature and the weight loss was 1%. The infra red spectrum showed loss of hydroxyl (although not as much loss as at 200° C.), drastic decrease in free hydroxyl, small open chain anhydride peaks, decrease in —C—CH₃, a trace of conjugated unsaturation, and possibly an alkylene ether linkage. Volatile products in addition to those listed above were hydroxyethylether and diethylene glycol. In neither case did the infra red spectrum show a significant decrease in the band for the chlorine to carbon bond. The results show the copolymer can be self-cured by heating to 150° C. As the mechanism of cross-linking, the evidence indicates acid catalyzed ether formation, and acid hydrolysis of ester groups to give acid groups and then anhydride formation. The volatile products obtained, aside from those produced in such reactions, result from action of hydrogen chloride and water on the acid hydrolysis products.

The copolymers of the present invention can be molded, coated or otherwise formed into various shapes or films and cured by heating at temperatures of, for example, about 100° to 200° or 250° C.

Example 6

Vinyl chloride and hydroxyethyl ethyl fumarate were charged in weight ratio of 92/8 and copolymerized to obtain a copolymer having 30.5% by weight of combined hydroxyethyl ethyl fumarate and a monoethyl fumarate content of 1.6%. Urea-formaldehyde or melamine formaldehyde resins cured the polymer to tough, solvent resistant coatings. Resimene U-920 (a butylated urea-formaldehyde resin employed as a 60% solids concentration in a solution containing 30% isobutanol and 10% xylene) gave optimum cures employed at 3 to 14% (dry weight) in coatings on steel, but other amounts from about 1% to 20% or more by weight can be used. A 15 minute bake at 150° C. gave the best results, but 30 minutes at 125° C. was almost as satisfactory. The coatings can also be air dried for three days to give good insolubilization, although adhesion to the metal is poorer; the latter defect can be overcome by priming the metal surface. Butylated melamine formaldehyde resin, Resimene 882 (provided as a 66% solids concentration in xylene) can be used in similar proportions with similar results, although it gives greater insolubilization at a specified concentration; this curing resin may be preferred where high water resistance and exterior durability are required.

What is claimed is:

1. A copolymer of vinyl chloride and a diester of fumaric acid in which one of the esterifying groups is a hydroxy(oxa)hydrocarbyl group and the other esterifying group is selected from the group consisting of alkyl, cycloalkyl, aryl, aralkyl and alkaryl, and about 2 to about 75% by weight of the polymer is from the said diester.

2. A copolymer of vinyl chloride and a fumarate compound of formula

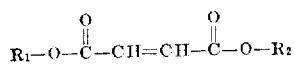

in which $R_1$ is a radical containing up to 10 carbon atoms selected from the group consisting of alkyl, cycloalkyl, aryl, aralkyl and alkaryl, and $R_2$ is selected from the group consisting of

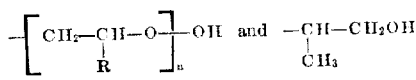

where $n$ is a number of average value from 1 to 8, and R is selected from the group consisting of methyl and hydrogen and about 2 to about 75% by weight of the polymer is from the said fumarate compound.

3. A copolymer of vinyl chloride and hydroxyalkyl alkyl fumarate in which the hydroxyalkyl and alkyl groups contain up to 10 carbon atoms and about 2 to about 75% by weight of the polymer is from the said hydroxyalkyl alkyl fumarate.

4. The copolymer of claim 1 in which free carboxyl groups, calculated as monoethyl fumarate, constitute no more than 1.5% by weight of the copolymer.

5. The copolymer of claim 3 in which the molecular weight is in the range of 1000 to 10,000 and about 10% to 40% by weight of the polymer is from the hydroxyalkyl alkyl fumarate.

6. A copolymer of vinyl chloride and ethyl hydroxyethyl fumarate in which about 2% to about 75% by weight of the copolymer is from ethyl hydroxyethyl fumarate.

7. A copolymer of vinyl chloride and butyl hydroxyethyl fumarate in which about 2% to about 75% by weight of the copolymer is from butyl hydroxyethyl fumarate.

8. A solution containing copolymer and monocyclic aromatic hydrocarbon solvent, the copolymer constituting at least 30% by weight of the solution and being a copolymer of vinyl chloride and hydroxyalkyl alkyl fumarate in which about 2% to about 75% by weight of the copolymer is from hydroxyalkyl alkyl fumarate.

9. The process of preparing copolymers which comprises copolymerizing vinyl chloride and a diester of fumaric acid in which one of the esterifying groups is an hydroxy(oxa)hydrocarbyl group and the other esterifying group is selected from the group consisting of alkyl, cycloalkyl, aryl, aralkyl and alkaryl in the presence of a free radical catalyst and the said diester being supplied as necessary to have it constitute from 1% to 20% by weight of the monomers present.

10. The process of preparing copolymers which comprises copolymerizing vinyl chloride and hydroxyalkyl alkyl fumarate in the presence of a free radical catalyst, the hydroxyalkyl alkyl fumarate being supplied as necessary to constitute from 1% to 20% by weight of the monomers present.

11. The process of claim 9 in which the catalyst is an azo catalyst.

12. The process of preparing copolymers which comprises copolymerizing vinyl chloride and hydroxyalkyl alkyl fumarate, the said hydroxyalkyl alkyl fumarate containing less than 5% by weight monoalkyl fumarate and being supplied as necessary to constitute from 1% to 20% by weight of the monomers present.

13. The copolymer of claim 1 which has been heat-cured.

14. The process of obtaining a cured, shaped vinyl chloride/hydroxyalkyl alkyl fumarate copolymer article which comprises copolymerizing vinyl chloride with hydroxyalkyl alkyl fumarate in the presence of a free radical catalyst, the said hydroxyalkyl alkyl fumarate being used in amount such that about 2% to about 75% by weight of the resulting copolymer is produced therefrom, forming the resulting copolymer into a desired shape, and curing by heating to 100–200° C.

15. The process of obtaining coatings of vinyl chloride/hydroxyalkyl alkyl fumarate copolymers which comprises copolymerizing vinyl chloride and hydroxyalkyl alkyl fumarate in the presence of a free-radical catalyst, the said hydroxyalkyl alkyl fumarate being used in amount such that about 2% to about 75% by weight of the resulting copolymer is produced therefrom, and depositing a coating of the resulting copolymer on a substrate from solution in aromatic solvent.

16. The solution of claim 8 in which the molecular weight of the copolymer is in the range of 1000 to 5000 producing low viscosity and 10% to 40% by weight of the copolymer is from the hydroxyalkyl alkyl fumarate.

17. The process of claim 10 in which the monomers are polymerized in solution at higher temperatures producing copolymers of lower molecular weights no greater than 5000.

(References on following page)

References Cited

UNITED STATES PATENTS 2,897,169 7/1959 Dazzi _____ 260—78.5

FOREIGN PATENTS 1,098,716 2/1961 Germany.
467,383 8/1950 Canada.
622,823 6/1961 Canada.
200,291 9/1938 Switzerland.

OTHER REFERENCES

Sans: Industries des Plastiques, vol. 3, No. 8, August 1947, pp. 281–285.

ALLAN LIEBERMAN, *Primary Examiner.*

PO-1050
(5/69)

UNITED STATES PATENT OFFICE
CERTIFICATE OF CORRECTION

Patent No. 3,392,137          Dated July 9, 1968

Inventor(s) Robert J. Slocombe

It is certified that error appears in the above-identified patent and that said Letters Patent are hereby corrected as shown below:

Column 1, line 46, "0 -]- or" should read -- 0 -]- H or --.
    See spec page 3, line 7.

Column 2, line 38, "applictions." should read -- applications. --.
    See spec page 5, line 19.

Column 2, line 54, "condition" should read -- conditions --.
    See spec page 6, line 11.

Column 5, line 6 (in Table I), the third column in the Table "Type BHF Reaction" should read -- Type BHF Used --.

Used Time, hrs.

(the fourth column should read -- Reaction Time, hrs. --).
    See spec page 14.

SIGNED AND
SEALED

SEP 30 1969

(SEAL)
Attest:

Edward M. Fletcher, Jr.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,392,137          Dated July 9, 1968

Inventor(s) Robert J. Slocombe

It is certified that error appears in the above-identified patent and that said Letters Patent are hereby corrected as shown below:

Column 1, line 46, "0 -]- or" should read -- 0 -]- H or --.
    See spec page 3, line 7.

Column 2, line 38, "applictions." should read -- applications. --.
    See spec page 5, line 19.

Column 2, line 54, "condition" should read -- conditions --.
    See spec page 6, line 11.

Column 5, line 6 (in Table I), the third column in the Table "Type BHF Reaction" should read -- Type BHF Used --.
Used Time, hrs.
(the fourth column should read -- Reaction Time, hrs. --).
    See spec page 14.

SIGNED AND
SEALED

SEP 30 1969

(SEAL)
Attest:

Edward M. Fletcher, Jr.
Attesting Officer

WILLIAM E. SCHUYLER, JR.
Commissioner of Patents